(12) United States Patent
Needham et al.

(10) Patent No.: US 11,601,086 B2
(45) Date of Patent: *Mar. 7, 2023

(54) SOLAR CANOPY SYSTEM WITH ROLL-FORMED STRUCTURAL COMPONENTS

(71) Applicant: RBI Solar, Inc., Cincinnati, OH (US)

(72) Inventors: Christopher Thomas Needham, Mountain View, HI (US); Frank Carl Oudheusden, Mont Vernon, NH (US)

(73) Assignee: RBI SOLAR, INC., Cincinnati, OH (US)

( * ) Notice: Subject to any disclaimer, the term of this patent is extended or adjusted under 35 U.S.C. 154(b) by 155 days.

This patent is subject to a terminal disclaimer.

(21) Appl. No.: 16/671,804

(22) Filed: Nov. 1, 2019

(65) Prior Publication Data

US 2021/0135620 A1 May 6, 2021

(51) Int. Cl.
*H02S 30/00* (2014.01)
*H02S 20/20* (2014.01)
*H02S 20/10* (2014.01)

(52) U.S. Cl.
CPC .............. *H02S 30/00* (2013.01); *H02S 20/10* (2014.12); *H02S 20/20* (2014.12)

(58) Field of Classification Search
CPC ........... H02S 20/10; H02S 20/20; H02S 30/00
See application file for complete search history.

(56) References Cited

U.S. PATENT DOCUMENTS

| 9,985,154 | B2* | 5/2018 | Needham | F24S 20/67 |
| 10,998,461 | B2* | 5/2021 | Needham | F24S 50/60 |
| 2006/0090788 | A1* | 5/2006 | Oak | H02S 20/23 |
| | | | | 136/244 |

(Continued)

FOREIGN PATENT DOCUMENTS

CA 3048086 A1 6/2018

OTHER PUBLICATIONS

Gilliss, M. "Structural Overview of Earth Anchors for PV Ground Mounted Arrays" Nuance Energy; Article [online]. May 11, 2017 [retrieved Jun. 30, 2020]. Retrieved from the Internet: <URL: https://nuanceenergy.com/solar-blog/structural-overview-of-earth-anchors-for-pv-ground-mounte d-arrays.

*Primary Examiner* — Sadie White
(74) *Attorney, Agent, or Firm* — Dickinson Wright PLLC

(57) ABSTRACT

A solar canopy has a solar panel assembly including a first solar panel coupled to a second solar panel and oriented non-parallel with respect to the second solar panel. A solar panel assembly support structure is coupled to the solar panel assembly. One or more components of the support structure are manufactured by cold rolling. The solar panel assembly has an effective solar-panel-assembly wind loading less than a sum of a first-solar-panel effective wind loading and a second-solar-panel effective wind loading determined individually. An actual load applied by the solar panel assembly to a solar-panel-assembly support structure coupled thereto when the solar panel assembly is subject to a wind loading is less than a design load for the solar panel (Continued)

assembly subject to the wind loading based on a sum of a first-solar-panel net pressure and a second-solar-panel net pressure determined independently.

18 Claims, 3 Drawing Sheets

(56) References Cited

U.S. PATENT DOCUMENTS

| | | | | |
|---|---|---|---|---|
| 2008/0168981 | A1* | 7/2008 | Cummings | F24S 25/50 126/600 |
| 2010/0000165 | A1* | 1/2010 | Koller | A01G 9/243 136/246 |
| 2010/0000596 | A1* | 1/2010 | Mackler | H02S 40/32 136/246 |
| 2010/0108113 | A1* | 5/2010 | Taggart | H02S 20/10 135/96 |
| 2011/0005560 | A1* | 1/2011 | Nair | E04H 15/58 135/117 |
| 2011/0024582 | A1* | 2/2011 | Gies | F24S 25/16 248/122.1 |
| 2011/0072742 | A1* | 3/2011 | Beck | H02S 20/23 52/173.3 |
| 2011/0146661 | A1* | 6/2011 | Dudas | H02S 40/10 126/573 |
| 2011/0203633 | A1* | 8/2011 | Richardson | H02S 20/10 136/244 |
| 2013/0167907 | A1* | 7/2013 | Bitarchas | F24S 25/636 136/251 |
| 2014/0014155 | A1* | 1/2014 | Seery | H02S 20/10 136/244 |
| 2014/0216531 | A1* | 8/2014 | Werner | H02S 20/00 136/251 |
| 2014/0261642 | A1* | 9/2014 | Beck | H01L 31/042 211/41.18 |
| 2014/0366465 | A1 | 12/2014 | Bragagna et al. | |
| 2016/0056752 | A1* | 2/2016 | Atchley | F24S 25/13 29/428 |
| 2017/0149374 | A1 | 5/2017 | Ingram | |
| 2018/0269343 | A1 | 9/2018 | Needham et al. | |

* cited by examiner

SOLAR CANOPY SYSTEM WITH ROLL-FORMED STRUCTURAL COMPONENTS

BACKGROUND

The present disclosure relates to solar canopy systems for elevating photovoltaic (PV) panels above parking surfaces, whether located on the ground or elevated parking structures ("parking garages").

Many solar canopy systems some combination of hot-rolled steel members (HSS tubes, I-beams, etc.) or custom welded components in combination with cold-rolled module purlins or aluminum extrusions for module support. The use of hot-rolled members is primarily driven by the relatively high wind loads PV canopies are designed to and the drive toward minimizing the number of foundations used for a given canopy project. Generally speaking, hot-rolled members and custom truss members are capable of supporting higher loading than cold-rolled steel members.

One obstacle to cost reduction of PV structures is the secondary operations required to convert hot-rolled steel members into usable components. This secondary operation work requires additional fabrication, welding, shipping, handling, and corrosion protection steps that can add significant cost to the raw material cost of the canopy and thus drive total material cost higher.

However, using current manufacturing techniques, it is not feasible to produce cold-rolled members that are large enough to support the load of the solar canopy systems. Supporting beams, for example, currently use 2-3 times the volume of steel that is feasible to produce with current cold-rolling processes. Accordingly, although cold-rolling has the advantages described above over hot-rolling, existing solar canopy systems are not designed to make use of these advantages.

An example conventional PV canopy structure is shown in FIG. 1 (hereafter referred to as the monoslope PV canopy 1). As shown in FIG. 1, a vertical post 2 extends above a grade 3 and anchored below the grade 3 by a foundation 4. One or more solar panels 5 are supported on a beam 6 by purlins 7 extending between the panels 5 and the beam 6. The beam 6, in turn, is mounted on the post 2 and an angle. The vertical post 2 is typically composed of a hot-rolled member such as an I-beam or hollow structured section tube ("HSS tube"), although other hot-rolled sections or truss designs can be used as well. The beam 6, which may be supported by one or more posts along its span length, is also composed of hot-rolled members or truss designs. Finally, modules may be supported by module rails which are typically positioned at right angles to the beams and span over multiple beams through 1 or more connected module rails. These rails are typically the only components to be cold-rolled steel members, although extruded aluminum is also used in some designs primarily for installation labor considerations. A number of different bracket designs and other fastening methods are employed to connect all steel members together into a PV canopy structure.

The structure of the monoslope PV canopy 1 may be found in the American Society of Civil Engineers Standard for Minimum Design Loads for Buildings and Other Structures, ASCE/SEI 7-10 (hereafter referred to as ASCE 7-10) in FIG. 27.4-4 for monoslope free roofs. It is well accepted within the solar power industry that the wind pressures prescribed in ASCE 7-10, FIG. 27.4-4 are representative of the real world loading of these structures. For this reason, the largest suppliers of PV canopy structures do not typically utilize any wind tunnel testing in the design of their products.

Under current practice, the wind loading coefficients prescribed for canopy structures with two or more non-parallel planes of solar panels can result in higher wind loading and thus higher costs than the single plane of solar panels designs based on the wind loading coefficients shown in ASCE 7-10, FIG. 27.4-4. Therefore, there is a need for a design methodology for canopy support structures for two or more non-parallel planes of solar panels based on determining the net instantaneous wind loading across the total combined area of the non-parallel planes of solar panels.

DETAILED DESCRIPTION

Figure 1:
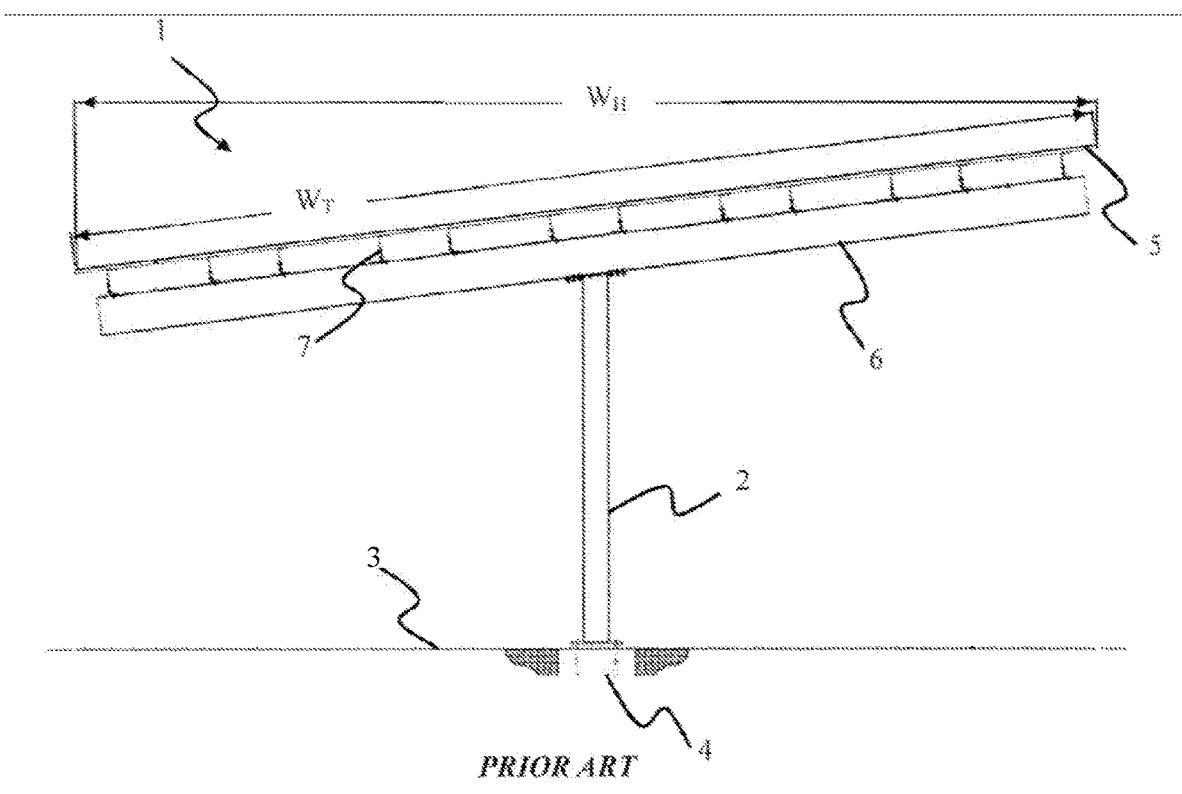
FIG. 1 is a side elevation view of a prior art canopy comprising a plurality of single, parallel plane photovoltaic solar panels.

Reference will now be made in detail to embodiments of the disclosure, examples of which are illustrated in the accompanying drawings. The terminology used in the description herein is for the purpose of describing particular embodiments only and is not intended to be limiting of the invention.

As used in the description and the appended claims, the singular forms "a", "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The words "right," "left," "lower" and "upper" designate directions in the drawings to which reference is made. The words "inwardly" and "outwardly" refer to directions toward and away from, respectively, the geometric center of the solar canopy, and designated parts thereof. The terminology includes the words noted above, derivatives thereof and words of similar import.

Although ordinal words such as "first" and "second" are used herein to describe various elements, these elements should not be limited by these words. These words are only used to distinguish one element from another. For example, a first panel could be termed a second panel, and, similarly, a panel tube could be termed a first panel, without departing from the scope of the present invention.

As used herein, the words "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting

[the stated condition or event]" or "in response to detecting [the stated condition or event]," depending on the context.

Solar Canopy Structure

The following description is directed towards various embodiments of a solar canopy in accordance with the present disclosure. The present disclosure generally relates to a solar canopy system and method for reducing canopy support structure design loadings. More particularly, the present invention relates to a solar canopy system having two or more non-parallel solar panel assemblies having a support structure design based on instantaneous time averaging of the measured wind loadings of the two or more non-parallel solar panels.

One obstacle to cost reduction of solar photovoltaic (PV) canopy structures is the wind loading prescribed by building codes. Currently, the majority of the canopy structure vendors in the industry do not utilize wind tunnel testing as measuring the wind loading on coplanar panel assemblies does not yield a useful decrease in loading compared to code prescribed loads.

Furthermore, the reduced loading made possible by the wind tunnel testing process described herein enables different designs to the canopy support structure. In particular, portions of the canopy support structure can advantageously be built using cold-rolled components.

Figure 2:
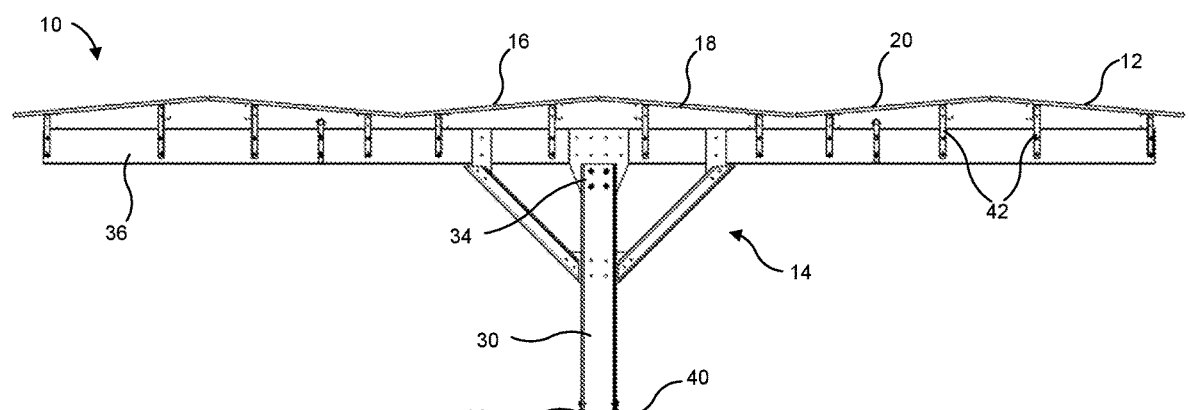
FIG. 2 illustrates an example embodiment of a solar canopy.

Referring to the drawings in detail, where like numerals indicate like elements throughout, there is shown in FIG. 2 an example embodiment of a solar canopy 10.

Figure 3:
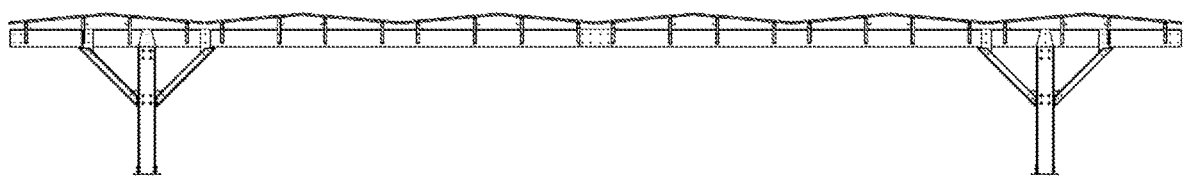
FIG. 3 illustrates another example embodiment of a solar canopy.

The canopy 10 comprises a solar panel assembly 12 supported by and coupled to a solar-panel-assembly support structure 14 as further described below. The solar panel assembly 12 comprises at least a first solar panel 16 with a total wind-exposed first-solar-panel surface area and a second solar panel 18 with a total wind-exposed second-solar-panel surface area. The solar panel assembly 12 may have one or more additional solar panels, such as a third solar panel 20 with a total wind-exposed third-solar-panel surface area. The solar panel assembly 12 can have a rectilinear array of solar panels including the first, second and third solar panels 16, 18, 20. The total number of solar panels comprising the array is a design choice based on the desired electrical output of the assembly. Typically, the solar panel assembly 12 includes at least adjacent six rows with three panels per row but could have more than six rows or less than six rows. FIG. 3 illustrates another example configuration of the solar panel assembly 12.

The second solar panel 18 is coupled to the first solar panel 16 such that the second solar panel 18 is oriented non-parallel with respect to the first solar panel 16. The third solar panel 20 is oriented non-parallel with respect to the second solar panel 18. For example, the first and second solar panels 16, 18 are tilted about 5-7 degrees from the horizontal, the first solar panel 16 being tilted in a counter clockwise direction and the second solar panel being tilted in a clockwise direction. The degree of tilt can be more or less than the about 5-7 degrees. The third solar panel 20 may be tilted parallel to the first solar panel; alternatively, the third solar panel 20 may be oriented non-parallel with respect to the first solar panel 16 and tilted in the counter clockwise direction at an angle different than the tilt angle of the first solar panel 16.

When subjected to wind loading, the solar panel assembly 12 has an effective solar-panel-assembly wind loading that is less than a sum of effective wind loading on each solar panel if the panel wind loadings are determined individually. For example, the effective assembly wind loading for the first solar panel 16 and second solar panel 18 is less than a sum of a wind loading determined on the first panel 16 (referred to herein as a first-solar-panel effective wind loading) and a wind loading determined on the second panel 18 (referred to herein as a second-solar-panel effective wind). The effective solar-panel-assembly wind loading is determined by wind tunnel testing of the solar panel assembly 12 whereby instantaneous time averaging of the measured pressures of two or more non-parallel solar panel assemblies determines the net wind loading as further discussed below.

The solar-panel-assembly support structure 14 comprises a post 30 having a post bottom end 32 and a post top end 34 spaced from the post bottom end 32. A cross beam 36 is attached to and supported by the post top end 34. The post bottom end 32 may be embedded directly in the ground, or may be attached to a foundation 40 in the ground. A plurality of purlins 42 extend between the cross beam 36 and the first, second and third solar panels 16, 18, 20 and support and couple the first, second and third solar panels 16, 18, 20 to the cross beam 36. The purlins 42 vary in length in order to achieve the desired tilt of the solar panels 16, 18, 20. The purlins 42 can have a variety of well known geometric shapes and are typically roll-formed shapes.

Figures 4A, 4B:
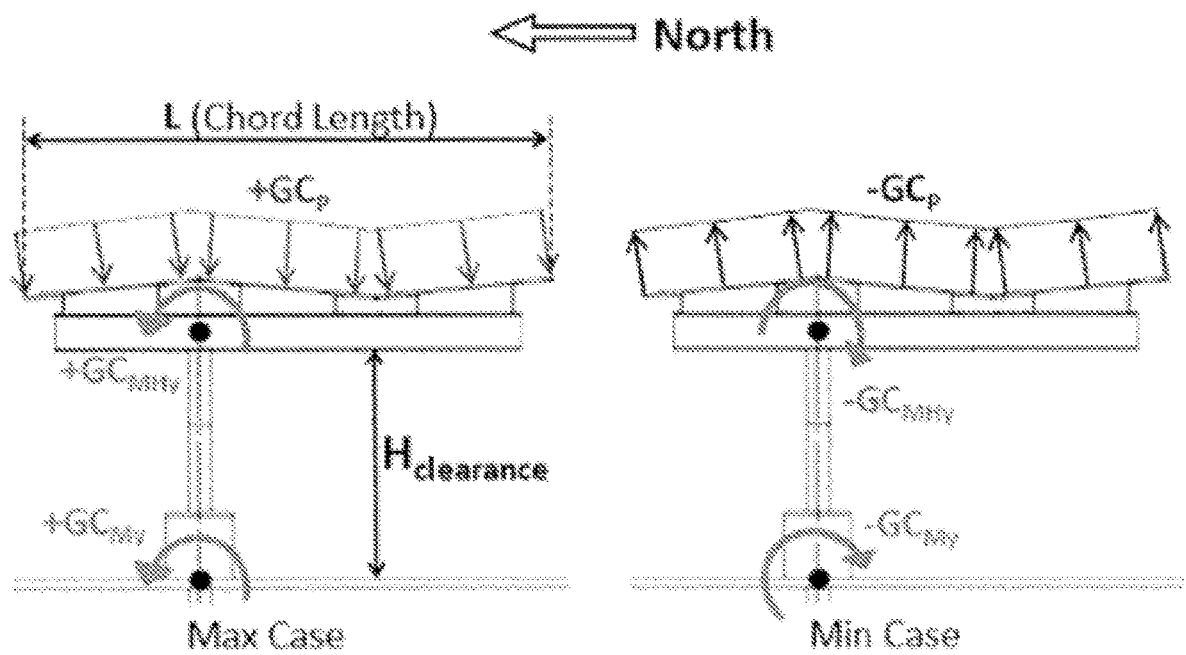
FIGS. 4A-4B illustrate example wind loading on a solar canopy.

The actual load applied by the solar panel assembly 12 through the purlins 42 and cross beam 36 to the post 30 when the solar panel assembly 12 is subject to a wind loading is less than a design load for the solar panel assembly 12 subject to the wind loading based on a sum of wind loading on each solar panel. For example, for a three-panel assembly 12, the design load for wind loading on the assembly 12 is based on a sum of wind loading on the first solar panel (a first-solar-panel net pressure), a wind loading on the second solar panel (a second-solar-panel net pressure), and a wind loading on the third solar panel (a third-solar-panel net pressure), when the first-solar-panel net pressure, the second-solar-panel net pressure and the third-solar-panel net pressure load are determined independently. See, for example, FIGS. 4A-4B.

Although various embodiments of solar canopies are shown in FIGS. 2 and 3, the invention is not limited to these canopies. The size of the solar panel assembly is a design choice based on the desired electrical output of the assembly. Other embodiments may include additional or fewer solar panels than shown in these figures. Similarly, the number and distribution of the posts, cross beams and purlins comprising the solar-panel-assembly support structure is based on determining the net instantaneous wind loading across the total combined area of the non-parallel planes of solar panels.

The design methodology for the foregoing canopy support structures having two or more non-parallel planes of solar panels is based on determining the net instantaneous wind loading across the total combined area of the non-parallel planes of solar panels. Referring to FIGS. 7A and 7B, force coefficient $GC_P$ and moment coefficients $GC_{MHy}$, $GC_{My}$, defined by the following equations are calculated from wind tunnel pressure data and are used to size all components of the solar-panel-assembly support structure.

$$GC_P = \frac{F_{normal}}{q_H \cdot A} \qquad \text{Eq. 1}$$

$$GC_{MHy} = \frac{M_{top\_of\_post}}{q_H \cdot A \cdot L} \qquad \text{Eq. 2}$$

-continued $$GC_{My} = \frac{M_{grade}}{q_H \cdot A \cdot L} \qquad \text{Eq. 3}$$

Where, $F_{normal}$ is the force normal to the top surface of the PV modules;

$M_{top\_of\_post}$ is the moment about the top of post (center of the cross beam);

$M_{grade}$ is the moment about the grade;

$q_H$ is the ASCE 7 velocity pressure at a height (H) of ≤4.5 m in open terrain;

A is the averaging area (No. of panels multiplied by 2 m²); and

L is the nominal chord length (e.g., 6 m for a three-panel system, 8 m for four-panel system, or 12 m for a six-panel system).

The wind tunnel pressure data is obtained by simultaneously measuring the pressure at pressure taps embedded in the surfaces of panels comprising the solar panel assembly to be supported by the solar-panel-assembly support structure.

Manufacturing a Solar Canopy

As described above, an actual load applied by the solar panel assembly 12 through the purlins 42 and cross beam 36 to the post 30 when the solar panel assembly 12 is subject to a wind loading is less than a design load for the solar panel assembly 12 subject to the wind loading based on a sum of wind loading on each solar panel. This reduction in the actual load applied to the support structure 14 enables the support structure 14 to be manufactured using less material than is used by support structures for different solar panel assembly designs. In particular, the reduced load on the support structure can decrease the size of structural components needed by the support structure into a domain in which the structural components can feasibly be manufactured by cold rolling instead of hot rolling.

At least a portion of the support structure 14 can be manufactured using cold-rolled structural members. For example, cold-rolled members can be used for the vertical post 30 and horizontal beam 36. Other components can be manufactured by cold-rolling, including a return tab on flanges, web stiffeners, or fully-boxed or closed members.

Cold rolling can beneficially eliminate secondary fabrication steps that would be required if the components were produced by hot rolling. For example, hot-rolled components typically require secondary fabrication steps such as adding fastener holes; adding stiffeners, gussets, or other load distributing features to beams or channels; or adding fastening plates or similar welded features. Some hot-rolled components also need corrosion protection provided by, for example, hot-dip galvanizing or painting.

Shapes of the structural components can also be more easily customized for a given application by cold rolling than when the components are produced by hot rolling. Hot-rolled components are typically standardized and application-agnostic, and may therefore not be tailored to the specific design needs of a particular solar canopy. In contrast, customized cold-rolled components can be designed and manufactured to meet the needs of a particular canopy structure. Accordingly, cold-rolled components can be designed to meet design specifications without significantly exceeding the specifications, resulting in less material used in the canopy structure. The reduced amount of metal used to build the structure decreases the cost and weight of the structure.

Cold rolling also reduces handling and logistical costs associated with hot-rolled structural members. Hot-rolled components are typically manufactured in large mills, and must be shipped to the site where the solar canopy is constructed. When corrosion protection is used, the components must additionally be shipped from the mill to a facility that can perform hot-dip galvanizing or painting before the components can be shipped to the canopy site. These mills and fabrication facilities are often long distances away from the canopy site, and thus the cost and time to ship the completed components to the site are often high. Cold-rolled materials, in contrast, are more easily transported, stored, and handled in coil form than hot-rolled materials. As a result, cold-rolled components can be more easily manufactured local to a solar canopy build site, reducing shipping costs and project lead times.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A solar canopy comprising:
   a solar panel assembly comprising:
   a first solar panel having a total wind-exposed first-solar-panel surface area; and
   a second solar panel having a total wind-exposed second-solar-panel surface area,
   wherein the second solar panel is coupled to and adjacent to the first solar panel,
   wherein the total wind-exposed second-solar-panel surface area has a non-parallel orientation with respect to the total wind-exposed first-solar-panel surface area,
   wherein the solar panel assembly has a third solar panel with a total wind-exposed third-solar-panel surface area, and the third solar panel is coupled to and adjacent to the second solar panel and has a non-parallel orientation with respect to the total wind-exposed second-solar-panel such that the second solar panel is arranged between the first and third solar panels, and
   a solar panel assembly support structure coupled to the solar panel assembly, the solar-panel-assembly support structure comprising components manufactured by cold-rolling,
   wherein the components include a horizontal cross-beam coupled to the solar panel assembly and a flange return tab such that the components are formed of a cold-rolled material;
   wherein the solar panel assembly support structure is designed to support an actual load applied to the solar-panel-assembly support structure by the solar panel assembly when the solar panel assembly is subject to a wind loading, wherein the actual load is less than a design load for the solar panel assembly subject to the wind loading based on a sum of a first-solar-panel net pressure for the first solar panel and a second-solar-panel net pressure for the second solar panel, the first-solar-panel net pressure and the second-solar-panel net pressure determined independently,
   wherein the actual load is obtained by simultaneously measuring a pressure at a plurality of taps embedded in the surface of the first and second solar panels.

2. The solar canopy of claim 1, wherein the solar panel assembly support structure comprises a post having a bottom end embedded in the ground and a top end coupled to the solar panel assembly, wherein the components manufactured by cold-rolling comprise the post.

3. The solar canopy of claim 1, wherein the components manufactured by cold-rolling further comprise at least one of a web stiffener or a fully boxed member.

4. The solar canopy of claim 1, wherein the solar panel assembly is a rectilinear array of a plurality of solar panels including the first solar panel, the second solar panel and the third solar panel.

5. The solar canopy of claim 4, wherein the rectilinear array comprises at least an adjacent six rows with three solar panels of the plurality of solar panels per row.

6. The solar canopy of claim 1, wherein the first solar panel and second solar panel are tilted at a tilt angle of about five degrees to about seven degrees from the horizontal, the first solar panel being tilted in a counter clockwise direction and the second solar panel being tilted in a clockwise direction.

7. The solar canopy of claim 6, wherein the third solar panel is tilted parallel to the first solar panel.

8. The solar canopy of claim 6, wherein is oriented non-parallel with respect to the first solar panel and tilted in the counter clockwise direction at another tilt angle different than the tilt angle of the first solar panel.

9. The solar canopy of claim 1, wherein the actual load applied to the solar-panel-assembly support structure is defined by a force coefficient GCP, a first moment coefficient GCMHy, and a second moment coefficient GCMy defined by the following equations:

$$F_{normal} = GC_p \times q_H \times A$$

$$M_{top\_of\_post} = GC_{MHy} \times q_H \times A \times L$$

$$M_{grade} = GC_{My} \times q_H \times A \times L$$

where,
Fnormal is a force normal to a top surface of the first or second solar panels;
Mtop_of_post is a moment about a top of the post (center of a cross beam);
Mgrade is a moment about a bottom of the post;
qH is a velocity pressure at a height (H) of ≤4.5 m in an open terrain;
A is a averaging area (Number of panels multiplied by 2 m$^2$); and
L is a nominal chord length, and
wherein the force coefficient GCP, the first moment coefficient GCMHy, and the second moment coefficient GCMy are calculated from wind tunnel pressure data obtained by simultaneously measuring the pressure at the plurality of pressure taps embedded in the surface of the first and second solar panels.

10. The solar canopy of claim 1, wherein a plurality of purlins extend substantially vertically between the cross beam and the first-solar-panel and between the cross beam and the second-solar-panel, and the purlins are each formed with a different length to achieve a desired tilt of the first and second solar panels.

11. A solar canopy comprising:
a solar panel assembly comprising:
a first solar panel having a total wind-exposed first-solar-panel surface area; and
a second solar panel having a total wind-exposed second-solar-panel surface area,
wherein the second solar panel is coupled to the first solar panel,
wherein the total wind-exposed second-solar-panel surface area has a non-parallel orientation with respect to the total wind-exposed first-solar-panel surface area,
wherein the solar panel assembly has a third solar panel with a total wind-exposed third-solar-panel surface area, and the third solar panel is coupled to the second solar panel and parallel to the first solar panel such that the solar panel assembly having the first, second, and third solar panels is formed with a repeating pattern shape along a length direction of a horizontal cross beam coupled to the solar panel assembly, and
a solar panel assembly support structure coupled to the solar panel assembly, the solar-panel-assembly support structure comprising one or more components manufactured by cold-rolling, wherein the one or more components manufactured by cold-rolling includes a flange return tab, such that the flange return tab is formed of a cold-rolled material;
wherein the solar panel assembly support structure is designed to support an actual load applied to the solar-panel-assembly support structure by the solar panel assembly when the solar panel assembly is subject to a wind loading, wherein the actual load is less than a design load for the solar panel assembly subject to the wind loading based on a sum of a first-solar-panel net pressure for the first solar panel and a second-solar-panel net pressure for the second solar panel, the first-solar-panel net pressure and the second-solar-panel net pressure determined independently,
wherein the actual load is obtained by simultaneously measuring a pressure at a plurality of taps embedded in the surface of the first and second solar panels.

12. The solar canopy of claim 11, wherein the solar panel assembly support structure comprises a post having a bottom end embedded in the ground and a top end coupled to the solar panel assembly, wherein the one or more components manufactured by cold-rolling comprise the post.

13. The solar canopy of claim 11, wherein the solar panel assembly support structure comprises a horizontal crossbeam coupled to the solar panel assembly, and wherein the one or more components manufactured by cold-rolling comprise the cross-beam.

14. The solar canopy of claim 11, wherein the one or more components manufactured by cold-rolling comprise at least one of a web stiffener, or a fully boxed member.

15. The solar canopy of claim 11, wherein the solar panel assembly is a rectilinear array of a plurality of solar panels including the first solar panel, the second solar panel and the third solar panel.

16. The solar canopy of claim 15, wherein the rectilinear array comprises at least an adjacent six rows with three solar panels of the plurality of solar panels per row.

17. The solar canopy of claim 11, wherein the actual load applied to the solar-panel-assembly support structure is defined by a force coefficient GCP, a first moment coefficient GCMHy, and a second moment coefficient GCMy defined by the following equations:

$$F_{normal} = GC_p \times q_H \times A$$

$$M_{top\_of\_post} = GC_{MHy} \times q_H \times A \times L$$

$$M_{grade} = GC_{My} \times q_H \times A \times L$$

where,
Fnormal is a force normal to a top surface of the first or second solar panels;

Mtop_of_post is a moment about a top of the post (center of a cross beam);

Mgrade is a moment about a bottom of the post;

qH is a velocity pressure at a height (H) of ≤4.5 m in an open terrain;

A is a averaging area (Number of panels multiplied by 2 m²); and

L is a nominal chord length, and wherein the force coefficient GCP, the first moment coefficient GCMHy, and the second moment coefficient GCMy are calculated from wind tunnel pressure data obtained by simultaneously measuring the pressure at the plurality of pressure taps embedded in the surface of the first and second solar panels.

18. The solar canopy of claim 4, wherein the rectilinear array comprises at least an adjacent three rows with three solar panels of the plurality of solar panels per row.

\* \* \* \* \*